United States Patent [19]

Laiserin et al.

[11] Patent Number: 5,761,995
[45] Date of Patent: Jun. 9, 1998

[54] METHOD OF IDENTIFYING AN AIR BAG MODULE ASSEMBLY WITH A MOTOR VEHICLE AND APPLYING CODED INDICIA ONTO A COVER OF THE AIR BAG MODULE ASSEMBLY

[76] Inventors: Michael Laiserin, 3154 Mark Alan Dr., Wantagh, N.Y. 11793; Paul O'Neill, 29 Oakland Ave., Bay Shore, N.Y. 11706

[21] Appl. No.: 794,183

[22] Filed: Feb. 3, 1997

[51] Int. Cl.⁶ ........................................ B41F 1/07
[52] U.S. Cl. .................. 101/32; 264/400; 264/482; 280/728.1
[58] Field of Search ............... 101/483, 17, 31, 101/32, 9, 27; 280/728.1, 728.3, 730.2, 731, 732, 733; 264/400, 464, 482; 70/209

[56] References Cited

U.S. PATENT DOCUMENTS

| | | |
|---|---|---|
| 1,956,016 | 4/1934 | Flothow. |
| 2,811,106 | 10/1957 | Picarello. |
| 3,170,008 | 2/1965 | Levine. |
| 3,392,501 | 7/1968 | Gilchrist. |
| 3,759,172 | 9/1973 | Conklin. |
| 4,387,640 | 6/1983 | Viol ............................ 101/9 |
| 5,105,065 | 4/1992 | Shibata ........................ 101/9 |
| 5,222,932 | 6/1993 | Fontecchio ................... 493/210 |
| 5,335,935 | 8/1994 | Proos et al. ................. 280/728.3 |
| 5,498,026 | 3/1996 | Eckhout ...................... 280/728.3 |
| 5,549,323 | 8/1996 | Davis ......................... 280/728.3 |
| 5,566,560 | 10/1996 | LiCausi ....................... 70/209 |
| 5,632,914 | 5/1997 | Hagenow et al. ............. 280/728.1 |

FOREIGN PATENT DOCUMENTS

| | | | |
|---|---|---|---|
| 404151345A | 5/1992 | Japan .......................... | 280/728.3 |
| 405301536A | 11/1993 | Japan .......................... | 280/728.3 |
| 2 252 268 | 8/1992 | United Kingdom ............ | 280/728.3 |

OTHER PUBLICATIONS

Research Disclosure 35603 "Integral Passenger Side Inflatable Restraint Door with Laser Generated Tear Seam" Anonymous. Research Disclosure Dec. 1993 p. 35603.

Air Bag Thefts on the Rise, Paul Dever—The Auto Channel Apr. 11, 1996 http://www.theautochannel.com/content/news/date19960411.

"Corvette Safety". Corvette Headquarters http://webadv.chron.com/display/b/bill_heard/bh4g.html, 1996.

"Auto Etch" Eastern Art Glass http://www.etchworld.com/autoetch/, 1996.

*Primary Examiner*—Eugene H. Eickholt
*Attorney, Agent, or Firm*—Michael I. Kroll

[57] ABSTRACT

A method of identifying an air bag module assembly (14) with a motor vehicle (16) and applying coded indicia (10) onto a cover (12) of the air bag module assembly (14) in the motor vehicle (16). The identifying method consists of comparing the coded indicia (10) on the cover (12) of the air bag module assembly (14) with coded indicia (10) in the motor vehicle (16). If the coded indicia (10) on the cover (12) of the air bag module assembly (14) matches up with the coded indicia (10) in the motor vehicle (16), it will establish that the air bag module assembly (14) belong to the motor vehicle (16) and thereby will prevent the theft of the air bag module assembly (14) from the motor vehicle (16). The applying method comprises a procedure for placing coded indicia (10) onto the cover (12) of the air bag module assembly (14).

22 Claims, 5 Drawing Sheets

(EXAMPLE OF VEHICLE IDENTIFICATION NUMBER, IE VIN STRUCTURE)

GENERAL MOTORS CORP.

```
 (1) (2) (3) (4) (5) (6) (7) (8) (9) (10) (11) (12) (13) (14) (15) (16) (17)
  1   G   1   Y   Y   2   2   P   8   S    5    1    1    0    6    8    2
```

- SEQ PRODUCTION NUMBER
- ASSEMBLY PLANT
- MODEL YEAR
- CHECK DIGIT
- ENGINE TYPE
- RESTRAINT SYSTEM
- BODY STYLE
- CARLINE SERIES
- MAKE
- MANUFACTURER
- NATION OF ORIGIN

USA — 1
CANADA — 2
MEXICO — 3
USA — 4 (1995)
JAPAN — J
KOREA — K

GM OF CANADA/SUZUKI — C
GENERAL MOTORS — G
SUZUKI — G
DAEWOO — L
NUMM. — Y
ISUZU — 8

Fig. 5
(PASSENGER SIDE AIRBAG)

METHOD OF IDENTIFYING AN AIR BAG MODULE ASSEMBLY WITH A MOTOR VEHICLE AND APPLYING CODED INDICIA ONTO A COVER OF THE AIR BAG MODULE ASSEMBLY

BACKGROUND OF THE INVENTION

1. Field of the Invention

The instant invention relates generally to marking systems and more specifically it relates to a method of identifying an air bag module assembly with a motor vehicle and applying coded indicia onto a cover of the air bag module assembly.

2. Description of the Prior Art

Numerous marking systems have been provided in prior art. For example, U.S. Pat. No. 1,956,016 to Flothow; U.S. Pat. No. 2,811,106 to Picarello; U.S. Pat. No. 3,170,008 to Levine; U.S. Pat. No. 3,392,501 to Gilchrist, Jr. and U.S. Pat. No. 3,759,172 to Conklin all are illustrative of such prior art. While these units may be suitable for the particular purpose to which they address, they would not be as suitable for the purposes of the present invention as heretofore described.

Flothow, Alfred C.

Electric Tire Numbering Disk

U.S. Pat. No. 1,956,016

In a device of the kind described, a cast member has a raised character integrally formed thereon. A longitudinal member projects from and is adapted as a handle for the cast member. A means is operable to heat the cast member and raised character. The means includes a tubular element having its main portion encased in the cast member with its ends projecting into the longitudinal member. The element has an inner resistance coil encased in a dielectric material. A pair of conductors terminate in the longitudinally extending member. A pair of terminals respectively connect the conductors with the ends of the resistance coil. A member pivotally mounted on the longitudinal member is adapted as a support for the device in either vertical or horizontal positions.

Picarello, Joseph Albert

Method of Printing Polyethylene for Bulk Packaging

U.S. Pat. No. 2,811,106

A method of printing on moisture resistant polyethylene sheet so the printed areas are resistant to pulling off and smearing which comprises printing on polyethylene sheet with a plastic printing ink with resilient type on a letter press. Heating the printed surface to at least about seventy four degrees centigrade for not less than ten seconds. Then chilling the printed surface to less than about minus thirty degrees centigrade for not less than fifteen seconds. Slowly warming the polyethylene sheet to room temperature.

Levine, Alfred B.

Embossing Process

U.S. Pat. No. 3,170,008

A process for providing an image on a thermoplastic member by deforming the surface of the member in a pattern corresponding to the image comprising the steps of producing a two-dimension heat pattern corresponding to the image. Exposing a region of a thermoplastic record member to the heat pattern, thereby to heat and raise the temperature of different discrete positions on the thermoplastic record in a two-dimensional configuration according to the pattern of information to soften the record member at the discrete heated positions. Subjecting the region of the record member exposed to the heat pattern to an electric field of sufficient intensity producing a dielectric force to deform the thermoplastic at the heated positions, but of insufficient intensity to deform the unheated positions thereon.

Gilchrist, Jr., James M.

Method of Marking Covered Items

U.S. Pat. No. 3,392,501

A method and apparatus for stamping or otherwise marking a surface through a barrier. The surface is coated, soaked or otherwise treated with a solution that is sensitive to heat, light or other forms of energy, and will change color or texture when subjected to the energy source. The surface is enclosed in a protective barrier, such as glass, cellophane, cardboard, or any substance, transparent or opaque, through which the energy may be transmitted. The coated surface and its protective barrier are subjected to the source of energy with a stencil or similar pattern forming device interposed therebetween, so that portions of the coated surface will change color or texture and a pattern will be formed thereon.

Conklin, Paul W.

Branding Apparatus and Method

U.S. Pat. No. 3,759,172

Indicia such as a vehicle identification number or unit serial number is electrically branded on a metal work piece such as an automobile by a metal strip with embossed indicia. Electrical current from a welding current supply source is passed through the metal strip with the indicia in contact with the work piece and this electrically brands the indicia onto the work piece. The foregoing abstract is merely a resume of one general application, is not a complete discussion of all principles of operation or applications, and is not to be construed as a limitation on the scope of the claimed subject matter.

SUMMARY OF THE INVENTION

A primary object of the present invention is to provide a method of identifying an air bag module assembly with a motor vehicle and applying coded indicia onto a cover of the air bag module assembly that will overcome the shortcomings of the prior art devices.

Another object is to provide a method of identifying an air bag module assembly with a motor vehicle and applying coded indicia onto a cover of the air bag module assembly, so as to create a visible deterrent which will prevent the theft of the air bag module assembly by making it useless and not saleable for thieves, since the coded indicia cannot be removed therefrom, while allowing the police and other investigating authorities to inspect the coded indicia on the air bag module assembly with the coded indicia in the motor vehicle to see if the air bag module assembly is the same as in the motor vehicle.

An additional object is to provide a method of identifying an air bag module assembly with a motor vehicle and applying coded indicia onto a cover of the air bag module assembly, whereby the coded indicia can be applied quickly onto the cover of the air bag module assembly without having to remove the air bag module assembly from the motor vehicle.

A further object is to provide a method of identifying an air bag module assembly with a motor vehicle and applying coded indicia onto a cover of the air bag module assembly that is simple and easy to use.

A still further object is to provide a method of identifying an air bag module assembly with a motor vehicle and applying coded indicia onto a cover of the air bag module assembly that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, the instant invention provides a method of identifying an air bag module assembly 14 with a motor vehicle 16 and applying coded indicia 10 onto a cover 12 of the air bag module assembly 14 in the motor vehicle 16, as shown in FIGS. 1 and 3 through 5.

The identifying method consists of the step of comparing the coded indicia 10 on the cover 12 of the air bag module assembly 14 at locations "A", "B" or C, with coded indicia 10 in the motor vehicle 16 at location "D". If the coded indicia 10 on the cover 12 of the air bag module assembly 14 matches up with the coded indicia 10 in the motor vehicle 16, it will establish that the air bag module assembly 14 belongs to the motor vehicle 16 and thereby will prevent the theft of the air bag module assembly 14 from the motor vehicle 16.

A first applying method consists of the steps of:

1. Putting a release agent coating 18 upon a surface 19 of the cover 12 of the air bag module assembly 14.
2. Placing a template bearing the coded indicia 10 over the release agent coating 18.
3. Employing heat into the template, so that the coded indicia 10 will be applied onto the cover 12 of the air bag module assembly 14.
4. Removing the template from the release agent coating 18.
5. Cooling the template, so that the template can be used again.

Figure 1:
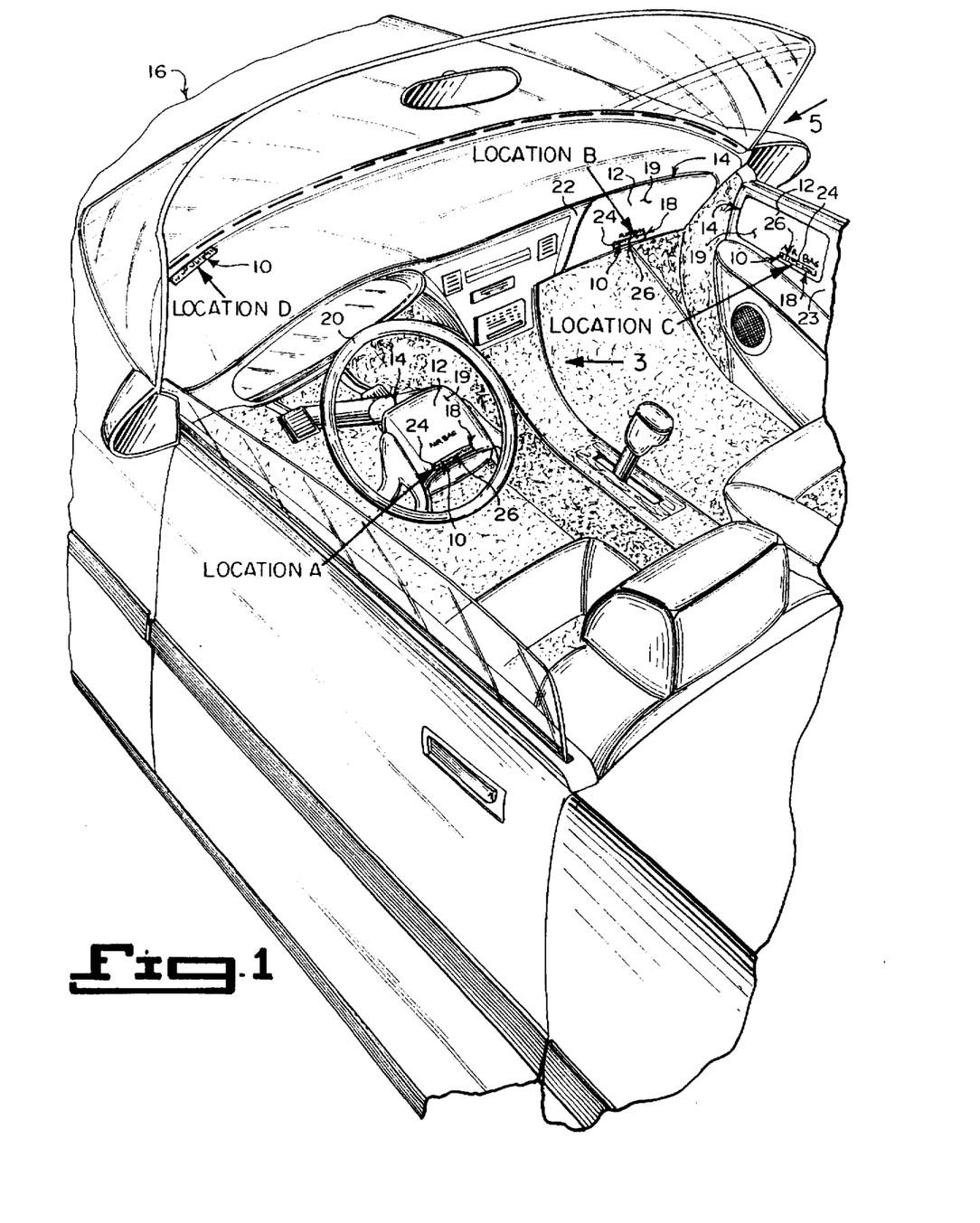
FIG. 1 is a perspective view of the interior of a motor vehicle with parts broken away, showing the coded indicia on the covers of air bag module assemblies and on the dashboard within the motor vehicle.
Figure 3:
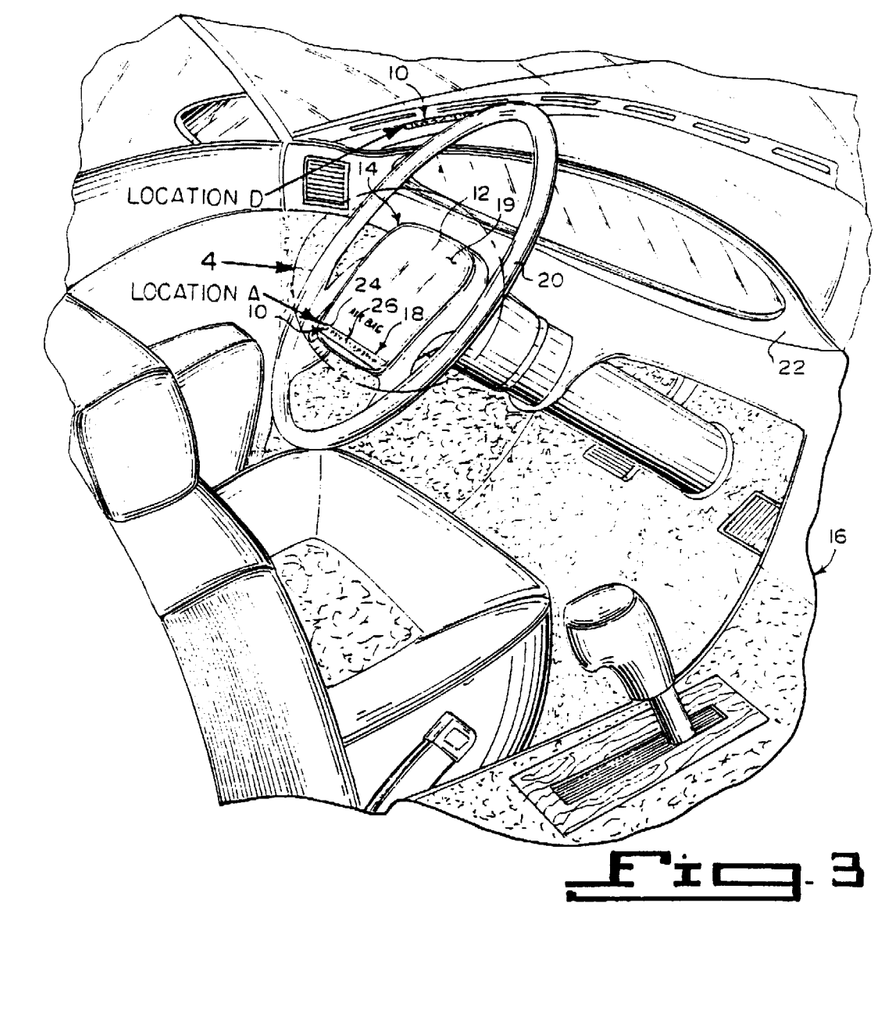
FIG. 3 is an enlarged perspective view taken in the direction of arrow 3 in FIG. 1, showing the coded indicia on the cover of the air bag module assembly mounted in the steering wheel, in the door side interior panel and on the dashboard within the motor vehicle.
Figure 4:
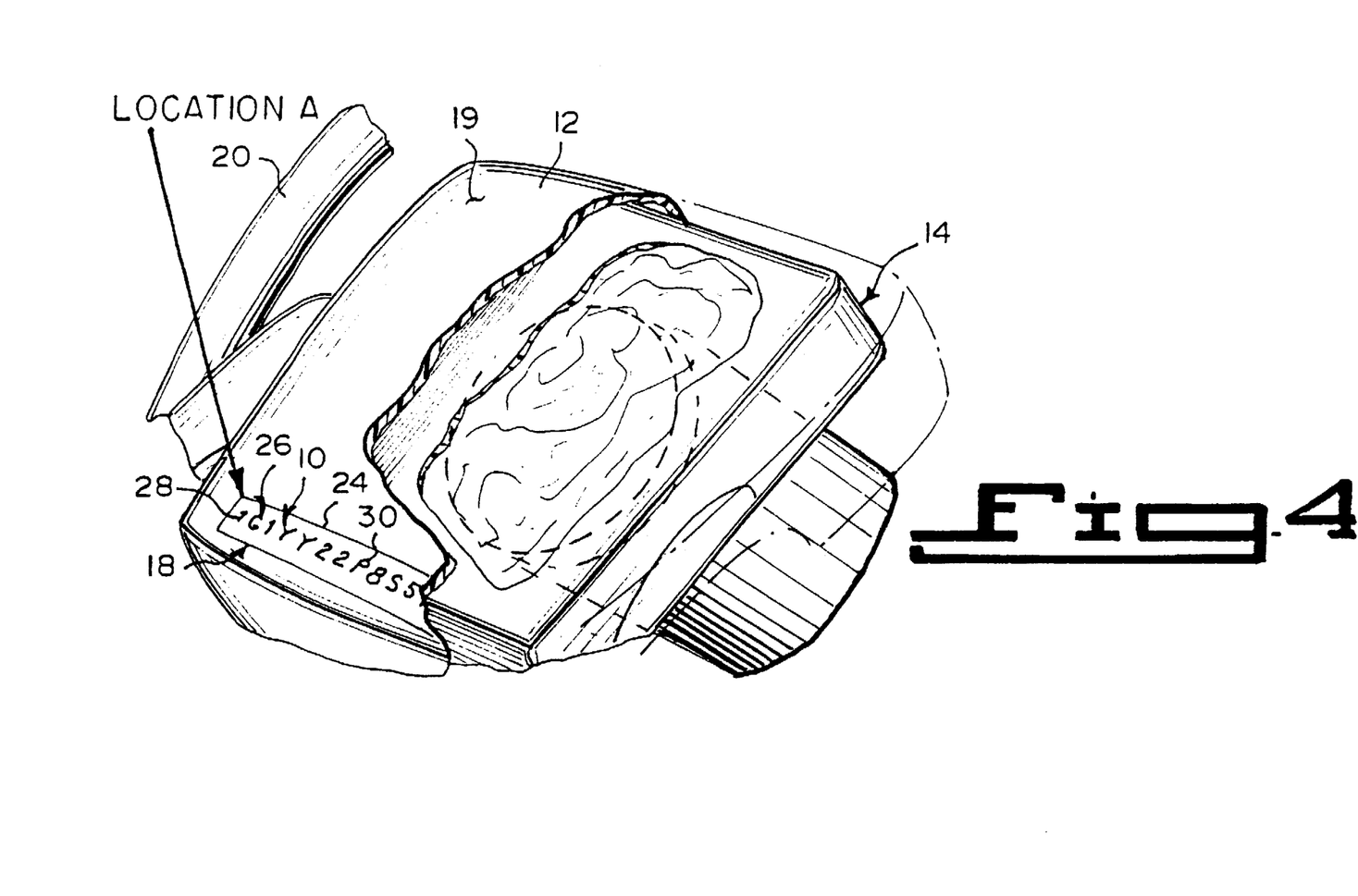
FIG. 4 is a further enlarged perspective view of the area in FIG. 3 indicated by arrow 4, with parts broken away and in section.
Figure 5:
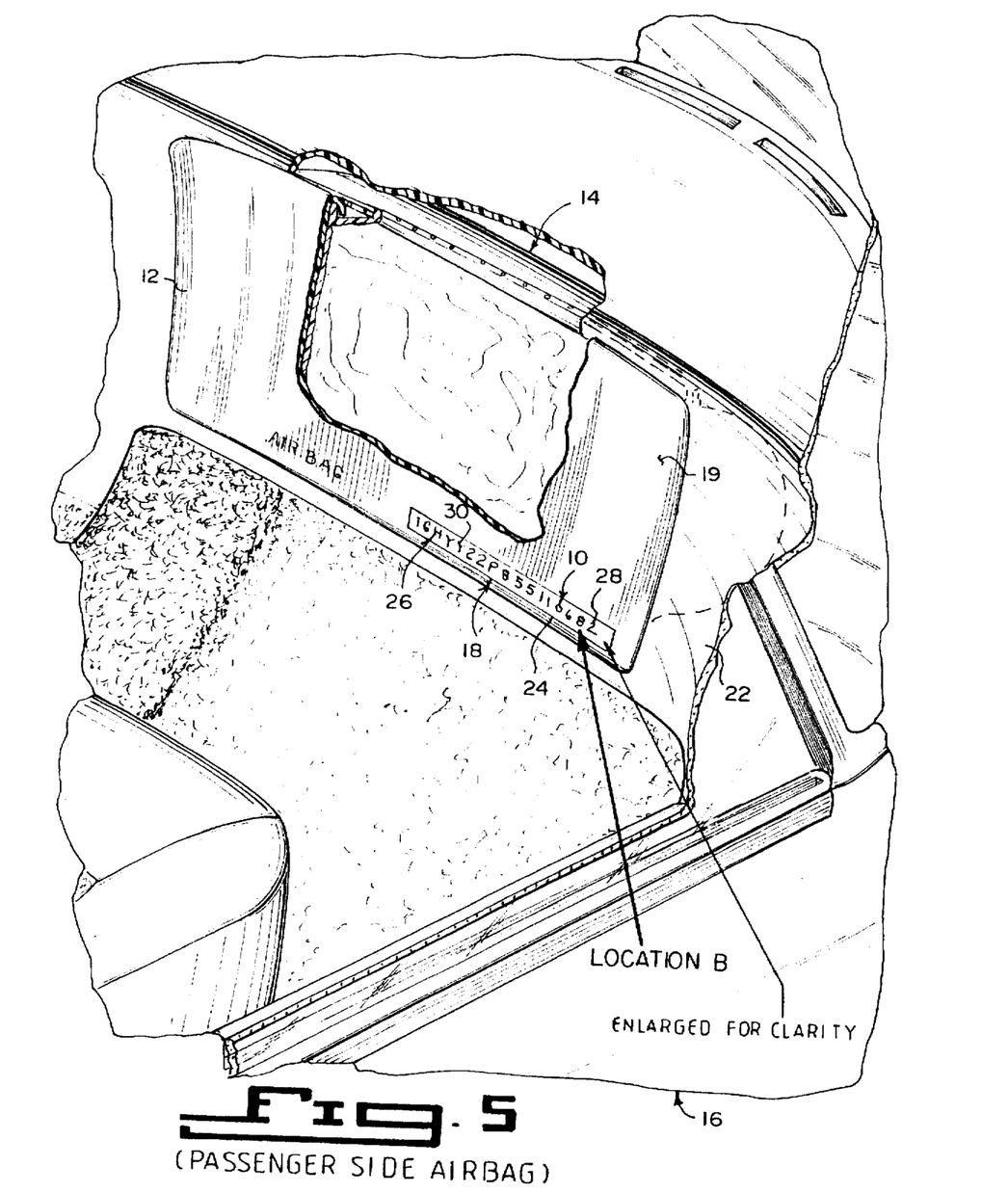
FIG. 5 is an enlarged perspective view taken in the direction of arrow 5 in FIG. 1, with parts broken away and in section, showing the coded indicia on the cover of the air bag module assembly mounted in the dashboard within the motor vehicle.

The air bag module assembly 14 in FIGS. 1, 3 and 4, is mounted in a steering wheel 20 of the motor vehicle 16. The air bag module assembly 14 in FIGS. 1 and 5, is mounted in a dashboard 22 of the motor vehicle 16. The air bag module assembly 14 in FIGS. 1 and 3, is also mounted in a door side interior panel 23 of the motor vehicle 16.

The release agent coating 18, is a thin silicone layer 24 to aid in the easy removal of the template, therefrom. The coded indicia 10 in the template is a vehicle identification number 26.

The heat can be employed with heated air. The heat can also be employed with an intense light beam, in which the intense light beam will be produced by a laser device. The cooling is accomplished with cool air, so that the template can return back to room temperature.

The laser device will produce a sharper coded indicia 10 and is more suitable for an automation system. The laser device can be Model ULS-25E, manufactured by Universal Laser Systems Inc. of Scottsdale, Ariz. The Model ULS-25E uses an air cooled, sealed 25 watt CO2 laser to produce the intense light beam. Other laser devices made by other manufacturers can also be utilized in producing the intense light beam.

A second applying method comprises the steps of:

1. Placing the air bag module assembly 14 beneath an intense light beam.
2. Employing the intense light beam to brand, etch or burn the coded indicia 10 onto the surface 19 of the cover 12 of the air bag module assembly 14.
3. Removing the intense light beam, so that the surface 19 of the cover 12 of the air bag module assembly 14 can return back to room temperature.

A third applying method consists of the steps of:

1. Applying an intense light beam to the surface 19 of the cover 12 of the air bag module assembly 14.
2. Employing the intense light beam to brand, etch or burn the coded indicia 10 onto the surface 19 of the cover 12 of the air bag module assembly 14.
3. Removing the intense light beam, so that the surface 19 of the cover 12 of the air bag module assembly 14 can return back to room temperature.
4. A fourth applying method contains the step of extruding the coded indicia 10 onto the surface 19 of the cover 12 of the air bag module assembly 14.

Figure 2:
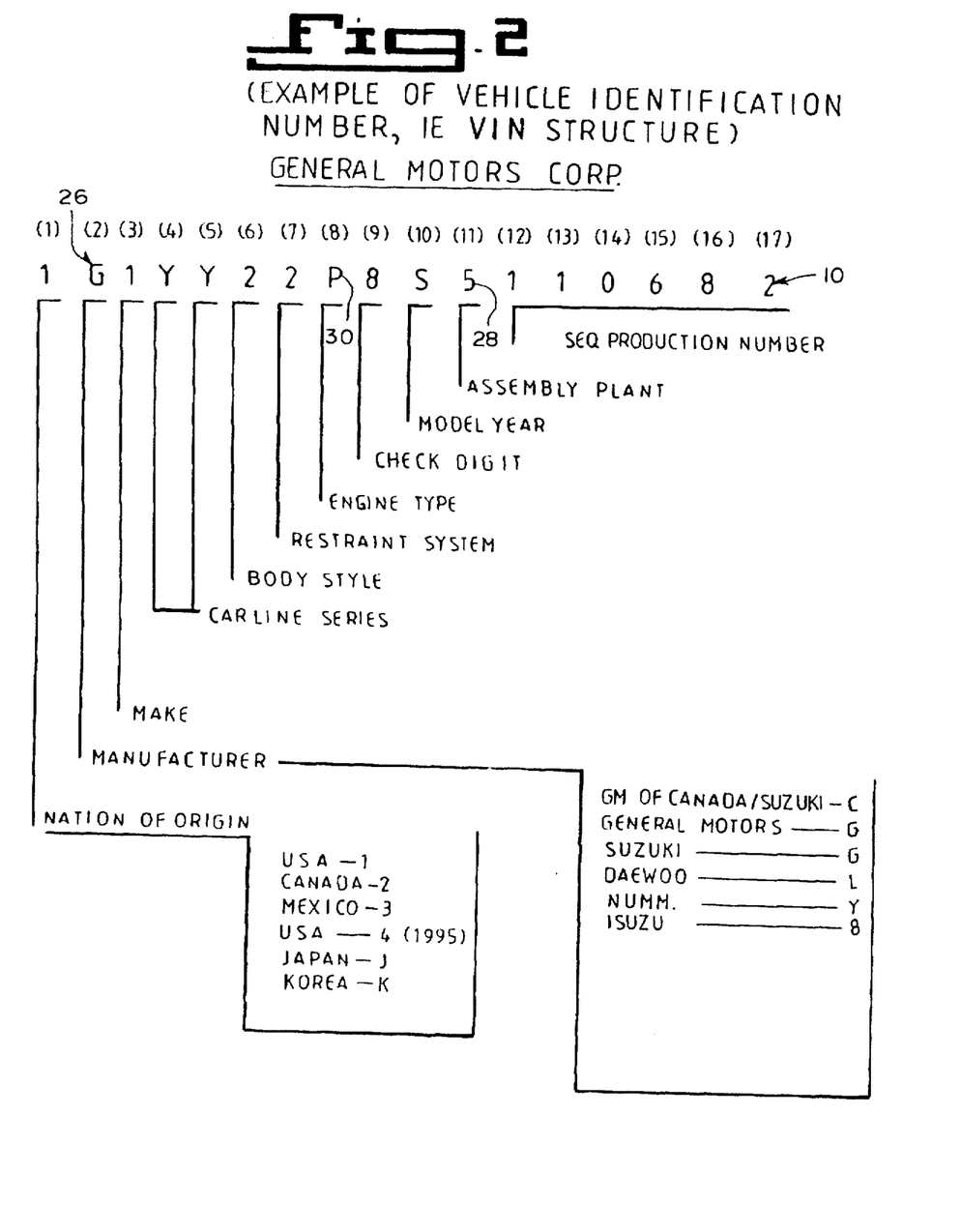
FIG. 2 is a chart showing the identification of each number and letter of the coded indicia which is a vehicle identification number.

FIG. 2 shows a typical example of the vehicle identification number 26. Each number 28 and letter 30 in the vehicle identification number 26 indicates data about a particular motor vehicle 16 manufactured by General Motors Corp. Other vehicle identification numbers 26 used by other manufacturers can also be utilized in conjunction with the instant invention, to allow the police and other investigating authorities to inspect the air bag module assemblies 14 to see if they have been stolen from other motor vehicles 16.

LIST OF REFERENCE NUMBERS

A location of 10 on 12 in 20
B location of 10 on 12 in 22
C location of 10 on 12 in 23
D location of 10 on 22 in 16
10 coded indicia on 12
12 cover of 14
14 air bag module assembly in 16
16 motor vehicle
18 release agent coating
19 surface of 12
20 steering wheel of 16
22 dashboard of 16
23 door side interior panel of 16
24 thin silicone layer for 18
26 vehicle identification number for 10
28 number of 26
30 letter of 26

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A method of applying coded indicia onto a cover of an air bag module assembly in a motor vehicle, comprising the steps of:
   a) putting a release agent coating upon a surface of the cover of the air bag module assembly;
   b) placing a template bearing the coded indicia over the release agent coating; and
   c) employing heat into the template, so that the coded indicia will be applied onto the cover of the air bag module assembly.

2. A method of applying coded indicia onto a cover of an air bag module assembly as recited in claim 1, further comprising the step of removing the template from the release agent coating.

3. A method of applying coded indicia onto a cover of an air bag module assembly as recited in claim 2, further comprising the step of cooling the template, so that the template can be used again.

4. A method of applying coded indicia onto a cover of an air bag module assembly as recited in claim 1, wherein the air bag module assembly is mounted in a steering wheel of the motor vehicle.

5. A method of applying coded indicia onto a cover of an air bag module assembly as recited in claim 1, wherein the air bag module assembly is mounted in a dashboard of the motor vehicle.

6. A method of applying coded indicia onto a cover of an air bag module assembly as recited in claim 1, wherein the air bag module assembly is mounted in a door side interior panel of the motor vehicle.

7. A method of applying coded indicia onto a cover of an air bag module assembly as recited in claim 1, wherein the release agent coating is a thin silicone layer to aid in the easy removal of the template therefrom.

8. A method of applying coded indicia onto a cover of an air bag module assembly as recited in claim 1, wherein the coded indicia in the template is a vehicle identification number.

9. A method of applying coded indicia onto a cover of an air bag module assembly as recited in claim 1, wherein the heat is employed with heated air.

10. A method of applying coded indicia onto a cover of an air bag module assembly as recited in claim 1, wherein the heat is employed with an intense light beam.

11. A method of applying coded indicia onto a cover of an air bag module assembly as recited in claim 10, wherein the intense light beam is produced by a laser device.

12. A method of applying coded indicia onto a cover of an air bag module assembly as recited in claim 3, wherein the cooling is accomplished with cool air, so that the template can return back to room temperature.

13. A method of applying coded indicia onto a cover of an air bag module assembly in a motor vehicle, comprising the steps of:
   a) putting a release agent coating upon a surface of the cover of the air bag module assembly;
   b) placing a template bearing the coded indicia over the release agent coating;
   c) employing heat into the template, so that the coded indicia will be applied onto the cover of the air bag module assembly;
   d) removing the template from the release agent coating; and
   e) cooling the template, so that the template can be used again.

14. A method of applying coded indicia onto a cover of an air bag module assembly as recited in claim 13, wherein the air bag module assembly is mounted in a steering wheel of the motor vehicle.

15. A method of applying coded indicia onto a cover of an air bag module assembly as recited in claim 14, wherein the air bag module assembly is mounted in a dashboard of the motor vehicle.

16. A method of applying coded indicia onto a cover of an air bag module assembly as recited in claim 15, wherein the air bag module assembly is mounted in a door side interior panel of the motor vehicle.

17. A method of applying coded indicia onto a cover of an air bag module assembly as recited in claim 16, wherein the release agent coating is a thin silicone layer to aid in the easy removal of the template therefrom.

18. A method of applying coded indicia onto a cover of an air bag module assembly as recited in claim 17, wherein the coded indicia in the template is a vehicle identification number.

19. A method of applying coded indicia onto a cover of an air bag module assembly as recited in claim 18, wherein the heat is employed with heated air.

20. A method of applying coded indicia onto a cover of an air bag module assembly as recited in claim 18, wherein the heat is employed with an intense light beam.

21. A method of applying coded indicia onto a cover of an air bag module assembly as recited in claim 20, wherein the intense light beam is produced by a laser device.

22. A method of applying coded indicia onto a cover of an air bag module assembly as recited in claim 18, wherein the cooling is accomplished with cool air, so that the template can return back to room temperature.

* * * * *

UNITED STATES PATENT AND TRADEMARK OFFICE
CERTIFICATE OF CORRECTION

PATENT NO. : 5,761,995            Page 1 of 2

DATED : 6/9/98

INVENTOR(S) : Laiserin et al.

It is certified that error appears in the above-identified patent and that said Letters Patent is hereby corrected as shown below:

Please add claim 23 as follows:

A method of applying coded indicia onto a cover of an air bag module assembly positioned within a motor vehicle and identifying the air bag module within the motor vehicle as being associated therewith, said method comprising the steps of:

a) putting a release agent coating upon a surface of the cover of the air bag module assembly;

b) placing a template bearing the coded indicia over the release agent coating;

c) employing heat into the template, so that the coded indicia will be applied onto the cover of the air bag module assembly;

d) comparing the coded indicia on the cover of the air bag module assembly with coded indicia in the motor vehicle; and

UNITED STATES PATENT AND TRADEMARK OFFICE
CERTIFICATE OF CORRECTION

PATENT NO. : 5,761,995
DATED : 6/9/98
INVENTOR(S) : Laiserin et al.

It is certified that error appears in the above-identified patent and that said Letters Patent is hereby corrected as shown below:

e) determining the air bag module assembly belongs with the motor vehicle when the coded indicia on the cover of the air bag module assembly matches the coded indicia in the motor vehicle to prevent theft of the air bag module assembly from the motor vehicle.

Signed and Sealed this

Twenty-third Day of February, 1999

Q. TODD DICKINSON

*Attest:*

*Attesting Officer*    *Acting Commissioner of Patents and Trademarks*